US009092958B2

(12) United States Patent
Brueggen et al.

(10) Patent No.: US 9,092,958 B2
(45) Date of Patent: Jul. 28, 2015

(54) ALARM PROCESSING SYSTEMS AND METHODS

(71) Applicant: Wal-Mart Stores, Inc., Bentonville, AR (US)

(72) Inventors: John-Paul Joseph Brueggen, Little Flock, AR (US); Alex Michael Shipman, Rogers, AR (US)

(73) Assignee: WAL-MART STORES, INC., Bentonville, AR (US)

( * ) Notice: Subject to any disclaimer, the term of this patent is extended or adjusted under 35 U.S.C. 154(b) by 0 days.

(21) Appl. No.: 14/020,231

(22) Filed: Sep. 6, 2013

(65) Prior Publication Data

US 2014/0266685 A1 Sep. 18, 2014

Related U.S. Application Data

(60) Provisional application No. 61/798,234, filed on Mar. 15, 2013.

(51) Int. Cl.
*G08B 19/00* (2006.01)

(52) U.S. Cl.
CPC ..................................... *G08B 19/00* (2013.01)

(58) Field of Classification Search
CPC .... G08B 19/00; G08B 27/005; G08B 19/005; G08B 19/02; H04L 12/1471; H04L 12/40013; H04L 12/413; H04L 12/66; H04L 65/1013; H04M 11/04

USPC ................. 340/500, 501, 506, 509, 521, 522, 340/539.22, 540; 324/500; 370/352; 379/37
See application file for complete search history.

(56) References Cited

U.S. PATENT DOCUMENTS

| | | | | |
|---|---|---|---|---|
| 5,768,119 | A * | 6/1998 | Havekost et al. | 700/4 |
| 7,633,384 | B2 * | 12/2009 | Kakimoto et al. | 340/506 |
| 2011/0010654 | A1 * | 1/2011 | Raymond et al. | 715/772 |
| 2011/0029582 | A1 * | 2/2011 | Schmidt et al. | 707/812 |
| 2012/0027010 | A1 * | 2/2012 | Elliot et al. | 370/352 |

* cited by examiner

*Primary Examiner* — Anh V La
(74) *Attorney, Agent, or Firm* — McCarter & English, LLP; David R. Burns

(57) ABSTRACT

According to an embodiment, a computer-implemented method of processing alarms, including a processor receiving machine-readable alarm information having a plurality of formats from a plurality of facility monitoring systems. The processor converting the machine-readable alarm information into normalized machine-readable event information having a common format and being free of vendor-specific alarm information, the normalized event information representing an exception condition detected by at least one of the plurality of monitoring systems. The method further includes the providing by the processor via a user interface, user access to the normalized event information independently of the alarm information.

20 Claims, 11 Drawing Sheets

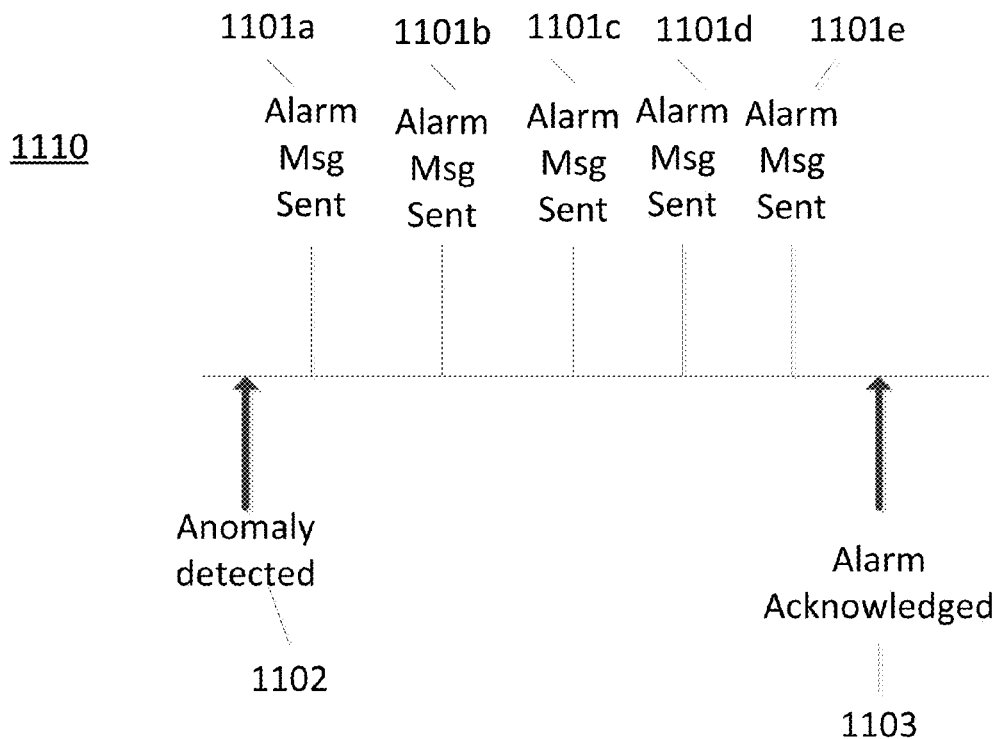
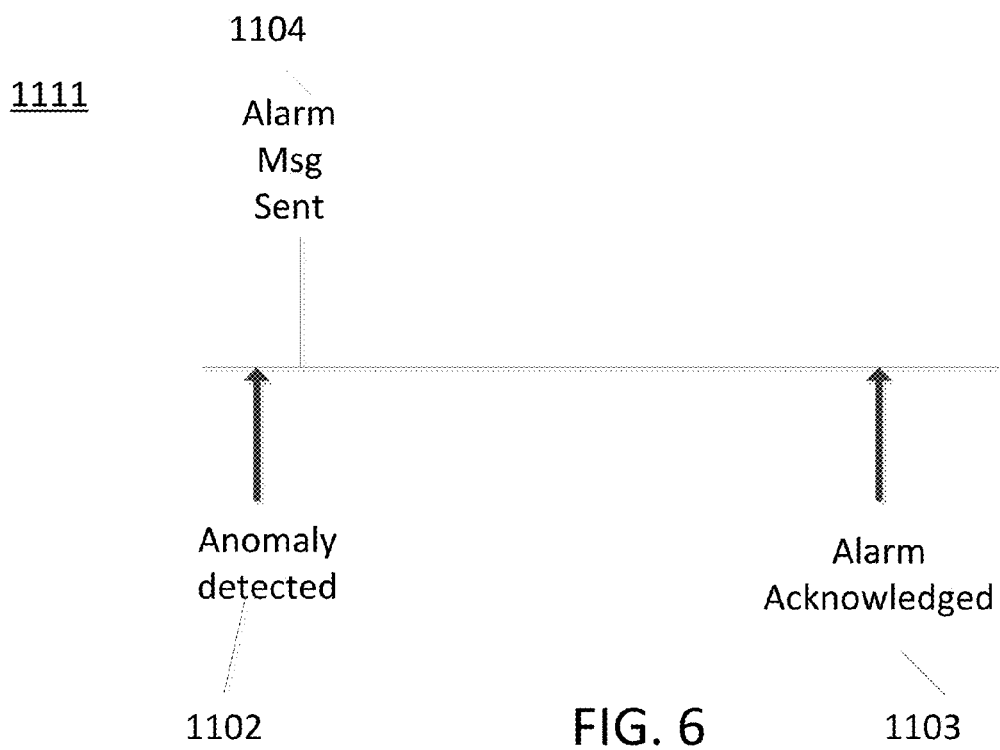
FIG. 6

810

```
-=-= Alarm Separator -=-=- Received: 201303130000 On Line: 8
03/13/13          Danfoss Automatic Controls            12:10AM
USIL SC 01228                                      HVAC, LIGHTS
AKC 55 Address #0       Alarm Log: Network 3     Version R02.101
***
Code 53              Generic: RG30 RECVNG           Addr: 30
Alarm occurred: 03/13/13 12:09AM            Current Value: Trip
Alarm if error                       Acknowledged: No
-----------------------------------------------------------------
[IP: 172.26.37.15] bytes received: 568
```

820

```
EXAMPLE 1:

DANFS|581793|9959458|US|4529|USIL SC 04529|SC|0|0|HVAC/LIGHTS|2|SYSTEM ALARMS|0|I/O COMM ERROR|0|0|2
013-03-05 17:24:00|DFS_I/O_COMM_ERROR|SYSTEM: RG2GROC/VST|0.0|0.0|0.0| |0.0|40|I/O COMM ERROR: ALARM
IF ERROR.|

EXAMPLE 2:

DANFS|581793|10020635|US|1923|USMI SC 01923|SC|0|0|HVAC/LIGHTS|0|MISC ALARMS|0|RELAY OFF|0|0|2013-03
-14 05:46:00|DFS_NETWORK_TEST|DANFOSS NETWORK OK|0.0|0.0|0.0| |0.0|105|Criteria match: HEARTBEAT Ev
ent.|

EXAMPLE 3:

DANFS|581793|9992314|US|361|USIL SC 00361|SC|0|0|HVAC/LIGHTS|0|HVAC: AHMCU2|0|HVAC FAN DOWN|0|0|2013
-03-10 07:58:00|DFS_AHU_ALARM|AHMCU2 AIRFLOW (02-1|0.0|0.0|0.0| |0.0|37|HVAC FAN DOWN: ALARM IF OFF
FOR 60 MINUTES.|
```

FIG. 8

ALARM PROCESSING SYSTEMS AND METHODS

RELATED APPLICATIONS

This application claims the benefit of U.S. Provisional Application No. 61/798,234, filed Mar. 15, 2013, the contents of which are incorporated herewith in its entirety.

BACKGROUND

Building automation systems can be included in a network of monitoring systems that supervise the operation of mechanical, electrical and lighting systems in a facility. For example, a refrigeration unit at one facility can be configured to operate within a predetermined temperature range, which is monitored by a corresponding monitoring system. The monitoring system may generate an alarm when the refrigeration unit is operating outside of the temperature range and transmit an alarm message to a central monitoring station in the network. The central monitoring station may receive alarm messages from several facilities and monitoring systems, where operators can view the messages and respond accordingly.

Some monitoring systems utilize proprietary or non-standard communication protocols for transmitting alarm messages. As such, networks having monitoring systems provided by different manufacturers may not be interoperable if the protocols are not compatible.

SUMMARY

According to various embodiments, alarms received from various facility monitoring systems can be converted into a normalized event information, by eliminating proprietary or non-standardized communication protocols. For example, the presence or absence of an exception condition can cause the facility to generate an alarm message, the message can be normalized and information from several monitoring systems can be presented in a common format.

According to an embodiment, a computer-implemented method of processing alarms includes receiving by the processor machine-readable alarm information having a plurality of formats from a plurality of facility monitoring systems. The method further includes converting by the processor, the machine-readable alarm information into normalized machine-readable event information having a common format and being free of vendor-specific alarm information. The normalized event information representing an exception condition can be detected by at least one of the plurality of monitoring systems and the processor can provide via a user interface, user access to the normalized event information independent of the alarm information.

In some embodiments, assigning the normalized event information to one of a plurality of queues by the processor may be based on a predefined set of rules. In some embodiments, the processor may automatically reassign the normalized event information to a different queue based on a predefined set of event resolution rules.

In some embodiments, the plurality of queues may include a pending event queue, an assigned event queue, a resolved event queue and an archived event queue. In some embodiments, the method may further include assigning by the processor a priority to the event information based at least in part on a predefined set of rules. In some embodiments, the method further includes the processor changing the priority based on the predefined set of rules.

In some embodiments, changing the priority may include changing the priority based on at least one of an amount of time elapsed since the alarm information was received and a number of discrete alarms contained in the alarm information. In some embodiments, the method may include the processor associating the normalized event information with a user based on a predefined set of rules.

According to an embodiment, a non-transitory computer-readable medium has stored thereon computer-executable instructions that when executed by a computer cause the computer to receive alarm information have a plurality of formats from a plurality of facility monitoring systems, convert the machine-readable alarm information into normalized machine-readable event information having a common format and being free of vendor-specific alarm information. The normalized event information representing an exception condition detected by at least one of the plurality of monitoring systems and providing a via a user interface, user access to the normalized event information independently of the alarm information.

According to an embodiment, a system for processing alarms can include a processor, a memory operatively coupled to the processor, the memory including computer-executable instructions that when executed by the processor cause the processor to receive machine-readable alarm information having a plurality of formats from a plurality of facility monitoring systems. The machine-readable alarm information can be converted into normalized machine-readable event information having a common format and being free of vendor-specific alarm information, the normalized event information representing an exception condition detected by at least one of the plurality of monitoring systems. The system further includes providing via a user interface, user access to the normalized event information independent of the alarm information.

Any combination or permutation of embodiments is envisioned. Other objects and features will become apparent from the following detailed description considered in conjunction with the accompanying drawings, wherein like reference numerals identify like elements. It is to be understood, however, that the drawings are designed as an illustration only and not as a definition of the limits of the present disclosure.

BRIEF DESCRIPTION OF THE DRAWINGS

FIG. 6 depicts a series of exemplary time lines describing the behavior of various facility monitoring systems in certain embodiments.

FIG. 8 depicts examples of alarm messages and normalized alarms in certain embodiments.

DESCRIPTION OF EXEMPLARY
EMBODIMENTS

Various embodiments disclosed herein are directed to systems and methods of processing alarms received from one or more facility monitoring systems. Some facilities can house one or more electrical and/or mechanical systems or fixtures, such as heating, ventilation and air conditioning (HVAC) systems, lighting systems, refrigeration systems, security systems, and/or fire detection systems. The operation and status of each such facility system and fixture can be monitored by a corresponding facility alarm management system (also referred to herein as an alarm interface), in particular, for the presence of one or more exception conditions that warrant attention (e.g., an automatic response or a manual response). A non-limiting example of an exception condition is a monitored operating condition of a facility system or fixture that is beyond a nominal or predefined parameter, such as an over-temperature condition or a fault condition. The presence or absence of an exception condition can cause the facility alarm management system to generate one or more alarm messages or other types of informational messages.

Figure 1:
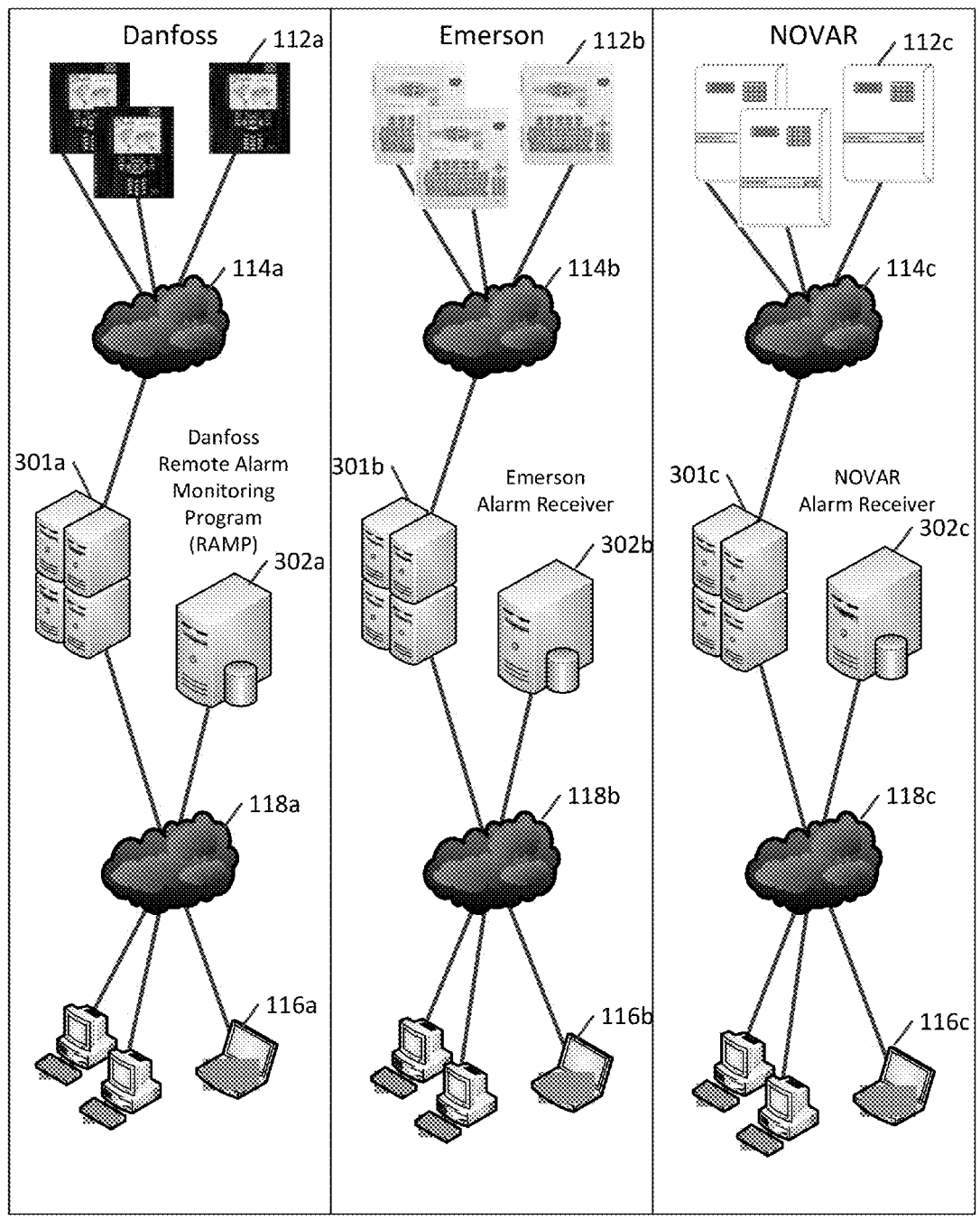
FIG. 1 depicts an example overview of several facility alarm management systems.

As depicted in FIG. 1, different conventional facility alarm management systems 112a, 112b, 112c may be designed by different automation solution vendors. In some instances, each facility alarm management system 112a, 112b, 112c is operatively connected to a corresponding alarm receiver 301a, 301b, 301c over a respective communication channel 114a, 114b, 114c. User interface terminals 116a, 116b, 116c are operatively connected to the corresponding alarm receivers 301a, 301b, 301c, as well as alarm message databases 302a, 302b, 302c, over a respective communication channel 118a, 118b, 118c.

Alarm messages generated by each facility alarm management system 112a, 112b, 112c in response to detecting one or more exception conditions can be transmitted, via the respective communication channel 114a, 114b, 114c, to the corresponding alarm message receiver 301a, 301b, 301c. The alarm message receiver 301a, 301b, 301c, in turn, can transmit one or more alarm messages, via the communication channel 118a, 118b, 118c, to the respective user interface terminals 116a, 116b, 116c. The term alarm, as used herein, refers to information about a unique data point (e.g., data from a monitored facility system or fixture capable of having an exception condition) and the time that the exception condition associated with the data point occurred and/or was reported or received by the facility monitoring system. An alarm may include additional information, such as customized data relevant to the data point, the value of a set point (e.g., a high/low limit), and/or customized flags indicating a status of the associated facility system or fixture.

Some facility alarm management systems 112a, 112b, 112c conventionally employ unique proprietary protocols or formats for transmitting alarm messages across the communication channel 114a, 114b, 114c to the corresponding alarm message receiver 301a, 301b, 301c. For example, an alarm message generated by one facility alarm management system 112a may be formatted differently than an alarm message generated by a different facility alarm management system 112b. As such, alarm message receivers 301a, 301b, 301c provided by different manufacturers may not be interoperable with the facility alarm management system 112a, 112b, 112c if the protocols or formats of the alarm messages are not compatible with the alarm message receiver 301a, 301b, 301c. As a result, the user interface terminals 116a, 116b, 116c must be connected to one or more different alarm message receivers 301a, 301b, 301c to receive alarm messages from the facility alarm management systems 112a, 112b, 112c.

According to some embodiments, it is advantageous to receive and process, at a central event management system, alarm messages from the different facility alarm management systems 112a, 112b, 112c despite any interoperability constraints, such as described above with respect to FIG. 1. In other embodiments, it is advantageous to isolate the various facility alarm management systems 112a, 112b, 112c or the alarm message receivers 301a, 301b, 301c and/or alarm message databases 302a, 302b, 302c from each other, e.g., for operational, performance and/or security reasons, while continuing to receive and process alarm messages from each of the facility alarm management systems 112a, 112b, 112c at the central location.

In overview, according to an embodiment, alarm messages generated by each facility alarm management system in response to detecting one or more exception conditions can be transmitted, via a communication network, to an event management system. The event management system, in turn, can receive and convert one or more alarm messages into one or more events corresponding to the exception condition(s) reported in the alarm message(s). For example, one over-temperature event may correspond to one or more related over-temperature exception conditions occurring in systems or fixtures at a facility. The term event, as used herein, refers to an aggregation or collection of at least a portion of data representing one or more common alarms, e.g., alarms and related parameters at the time of occurrence from a data point associated with a common occurrence of an exception condition. The event management system includes or is operatively connected to a relational database (e.g., an event management system database) and one or more staging databases each associated with a facility monitoring system. Each of a plurality of facility alarm management systems can provide alarm message data to the staging database, which is then polled by an event management system to retrieve the alarm message data from the staging database for storage in the relational database as one or more events. A user can utilize one or more interfaces to view, update and interact with the event data inside of the relational database and to add comments to keep track of actions taken with respect to the events. The event data can also be integrated with one or more work order applications used for technical dispatch to resolve the condition that caused the alarm. In some embodiments, a series of predefined business functions or rules can be implemented as automated processes to process the alarm messages and manage the events generated therefrom. For example, some processes may escalate the priority of certain events and/or assign certain events to a particular operator for resolution.

Figure 2:
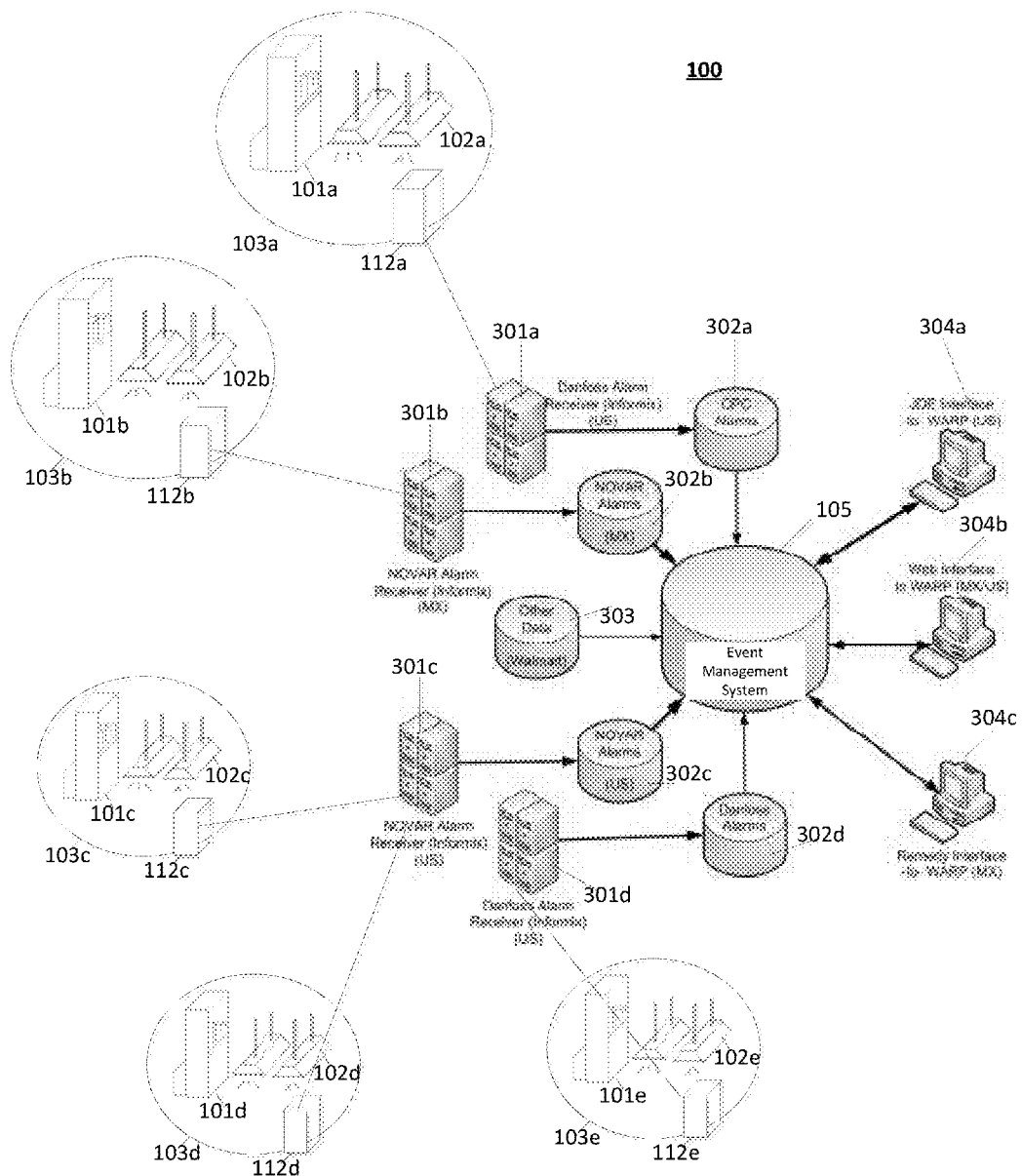
FIG. 2 depicts an exemplary block diagram of a topology of an alarm processing system and various facility alarm systems in certain embodiments.

FIG. 2 is a block diagram depicting a topology 100 of an alarm processing system including a network of facilities 103a-e. Some or all of the facilities 103a-e may be in the same physical location or in different physical locations. Each facility 103a-e can include a facility alarm management system 112a-e, such as described above with respect to FIG. 1, and one or more facility systems and fixtures, such as refrigerators 101a-e and lighting systems 102a-e, which are monitored by the corresponding facility alarm management systems 112a-e. It will be understood that the types of facility systems and fixtures described herein are examples; other types of facility systems and fixtures may also be present, such as HVAC systems, fire detection systems, security systems, and the like. Each facility 103a-e can have one or more facility monitoring systems 112a-e installed that can control and/or monitor the facility systems and fixtures at the facility. Examples of such automated solutions include the AK-SC255 System Controller (for building automation systems) manufactured by Danfoss North America of Baltimore, Md., Opus XCM (building automation systems) manufactured by NOVAR of Cleveland, Ohio, or the Einstein 2 (building automation system) manufactured by Emerson Retail Solutions of Keenesaw, Ga. Within the topology 100 are also alarm message receiver systems 301a-d operatively coupled to the corresponding facility alarm management systems 112a-e. As discussed above with respect to FIG. 1, each facility alarm management system 112a-e may be physically and/or operatively isolated from other facility alarm management systems (e.g., isolated by vendor). The topology further includes an event management system 105, and user interface terminals 304a-c. The facility systems and fixtures at each of the facilities 103a-e may, for example, be part of a single network, but may be individually operated by different automated solution vendors. The network can be located across a broad geographic area, in some instances spanning different countries or continents.

Facility monitoring system 112a can monitor the operation of facility systems and fixtures 101a and 102a, while facility monitoring system 112b can monitor the operation of facility systems and fixtures 101b and 102b, etc. For example, when one of the facility monitoring systems 112a-e detects an exception condition in the corresponding monitored facility system or fixture 101a-e, 102a-e, the facility monitoring system 112a-e can generate and transmit an alarm message via a communication network to the event management system 105. An exception condition may include, for example, an out-of-range parameter such as a timeout for a system operation, an over- or under-temperature condition, a system failure, an electrical component exceeding an allotted power consumption, or any other monitored parameter that is determined to be abnormal and/or requires attention by an operator.

In some embodiments, the facility monitoring systems 112a-e can communicate directly with event management system 105. In the topology 100 depicted in FIG. 1, the facility monitoring systems 112a-e can communicate with event management system 105 via alarm message receiver systems 301a-d. The alarm message receiver systems 301a-d can receive messages from a plurality of facilities 103a-e. For example, alarm message receiver system 301c can receive alarm messages from facilities 103c and 103d. Alarm message receiver systems 301a-d can then transmit alarm messages received from one or more facility monitoring systems 112a-d to the event management system 105 via alarm message databases 302a-d. The event management system 105 can also receive information from other databases 303, such as enterprise-level data related to store location or alignment, telephone numbers, or related data such as Work Orders issued. In some embodiments, event management system 105 can periodically poll the alarm message receiver systems 301a-d and/or alarm message databases 302a-d for new alarm messages that have not yet been transmitted to event management system 105.

The event management system 105 can include an alarm loader 107, which automatically processes the alarm messages. The alarm loader 107 can be configured to generate and/or update an event corresponding to one or more of the alarm messages. The term event, as used herein, is a logical construct (e.g., stored in a database) representing an exception condition of a facility system or fixture at one or more facilities 103a-e. In some embodiments, an event can be generated as a result of receiving, by the event management system 105, one or more alarm messages from one or more of the alarm message receiver systems 301a-d. In one example, one event may be generated from a single alarm message, where the alarm message includes information about a new alarm condition (e.g., a temperature out-of-range alarm just occurred). In another example, one event may be generated from multiple alarm messages, where the multiple alarm messages include information about the same alarm condition (e.g., a temperature out-of-range alarm is persistent). Events may represent temporal occurrences of exception conditions, for example, an event may persist for at least the same duration of time as the corresponding exception condition, or an event may persist after the exception condition no longer exists (e.g., for intermittent occurrences of an exception condition). Alarm loader 107 can check the alarm message to determine whether a new event needs to be created inside of the databases 236 of event management system 105, or whether an existing event within the databases already covers this alarm, based on, e.g., a set of rules 238. If an existing event covers a pre-existing alarm condition, the existing event can be updated to reflect information in the alarm message. The alarm loader 107 may include one or more processes to extract and transform vendor data 108 and one or more processes to load the transformed data into new or updated events 109. The extract and transform process 108 can utilize a set of rules 120 to transform disparate data sources into a normalized alarm format, which can be stored as event data in an event database. The alarm loading process 109 can be configured to create new events or update existing events in the event management solution using the normalized alarm data.

At least some of the terminals 304a-c can be used by operators (e.g., an employee or maintenance technician) at each facility to access the event data to view events in the database for resolving or managing an alarm condition. For example, the terminal 304a-c may be configured to display information about the event, such as identification of the facility system or fixture needing attention and the nature of the alarm. In another example, the terminal 304a-c may be configured to enable the operator to enter information related to the event, such as acknowledging or clearing an alarm, or assigning responsibility for responding to the event to another person.

In some embodiments, operators can use the terminals 304a-c to access data representing the event stored in the databases of event management system 105, but the operator cannot directly access data representing the alarm messages received from the alarm message receiver systems 301a-d. In other words, the event management system 105 can isolate the event data from the alarm message data (e.g., by extracting or hiding proprietary information in the alarm message), which may provide an additional layer of security (e.g., due to the proprietary nature of the protocols, one automation controls vendor may prefer that their alarm messages not be accessible to another automation controls vendor).

Each facility system and fixture 101a-e, 102a-e can transmit alarm messages to the alarm message receiver systems 301a-d using proprietary or vendor-specific message protocols or formats. Thus, the format and content of alarm messages can vary among different facility systems and fixtures 101a-e, 102a-e. Some embodiments include a alarm interface 106 (see, e.g., FIG. 2) between the event management system 105 and the alarm monitoring systems 112a-e to convert alarm messages having different protocols and formats into a common format.

Figure 3:
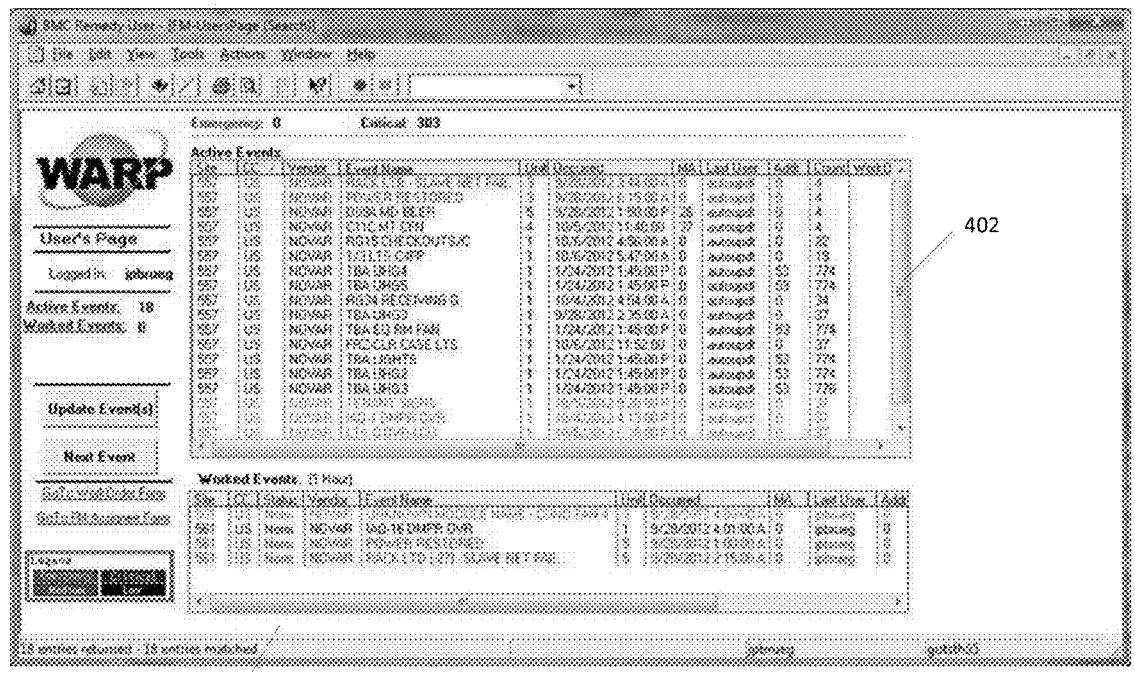
FIG. 3 depicts an exemplary graphical user interface configured to display events in certain embodiments.

FIG. 3 is an example of a user interface 400, which may be provided by one of terminals 304a-c. The user interface 400 can be configured to display at least some events for review by an operator. The interface may, for example, be provided in a browser 401, although it will be understood that other interfaces or interface hosts (e.g., Remedy or JD Edwards) may be utilized. The interface 400 can be configured to display a list of events 402, 403 corresponding to one or more alarm messages, and other information related to the event, such as status information or comments provided by the operator. Examples of such information include an event identification number, location information of the facility system or fixture corresponding to the alarm, and/or priority and/or status information associated with the event. In some embodiments, the interface 400 can be implemented on a JAVA®-based platform.

Figure 4:
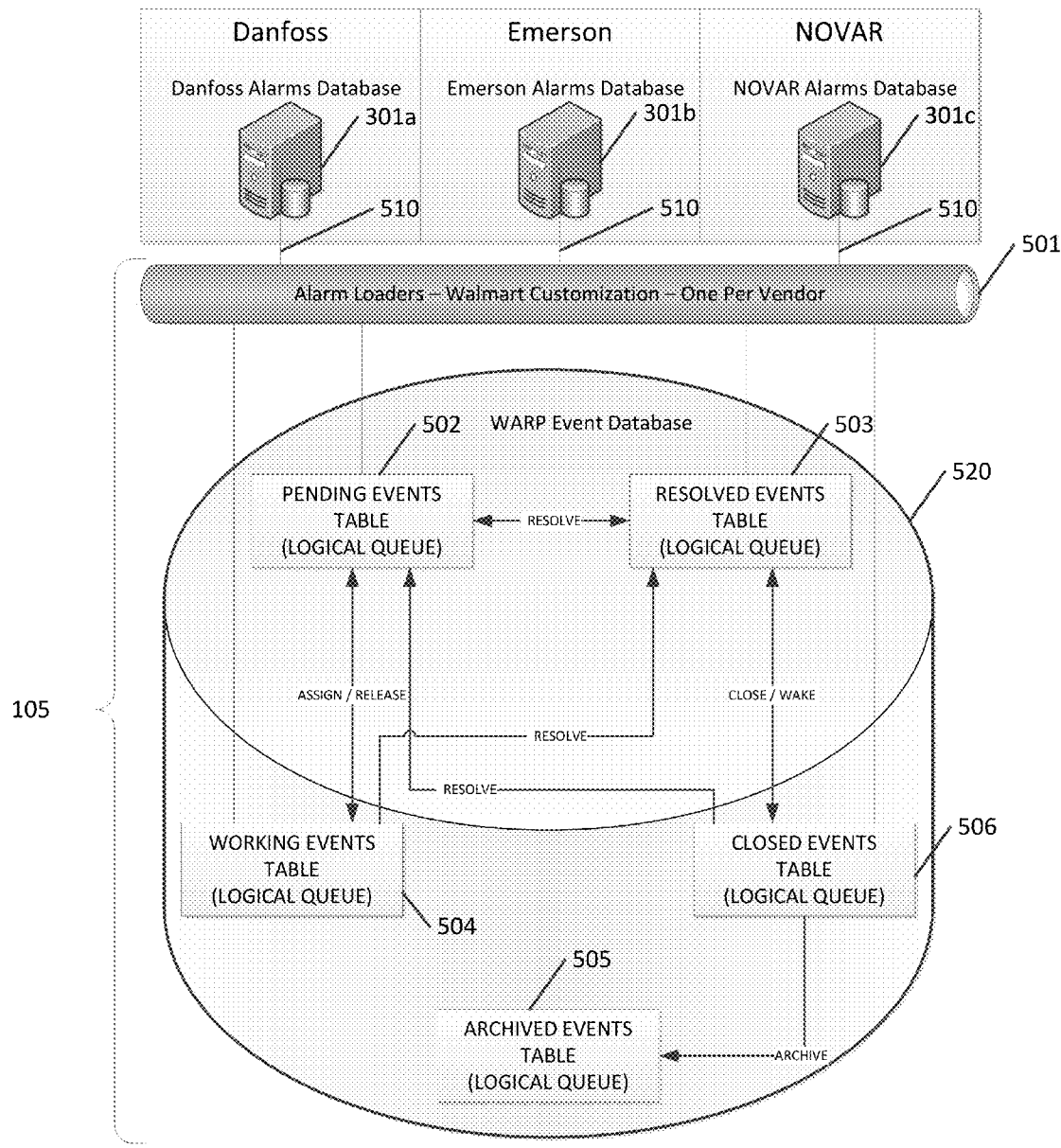
FIG. 4 depicts a block diagram of one example of the relationships between various event storage databases of the alarm processing system in certain embodiments.

FIG. 4 is block diagram depicting one example of the relationship between events stored in the event management system 105, according to an embodiment. Alarm loader 501 can convert inbound alarm messages 510 into new pending events, which can be stored in a pending events table 502 of an events database 520 or stored in an assigned/working events table 504 of the events database 520. The pending events table 502 can contain both new events needing action and old events needing review by an operator. A single event can be generated in response to receiving one or more alarm messages 510. For example, a single alarm for the failure of a refrigeration unit can generate a single event. However, when the refrigeration unit generates several alarms for the same failure condition, these alarms can be aggregated by the alarm loader 501 to generate a single event related to the failure condition. As additional alarm messages 510 arrive, the alarm loader 501 can update the existing event to reflect the persisting exception condition.

The events database 520 may be part of a relational database such as a Microsoft SQL server or similar database. Each of the tables 503, 504, 505, 506 may also be part of a relational database and can be stored in the same or different database as other tables. The pending events table 502 can include both newly created events by the alarm loader 501 and assigned to a pending event queue, as well as events which have been waiting in the pending event queue for a period of time and are in need of assignment to the assigned events table 504.

Assigned events table 504 can store entries in an assigned event queue regarding pending events that have been assigned to an operator for remedial action, using, for example, the process discussed below with respect to FIG. 5. An assigned events process can assign events to an operator, can release an event back to the pending event table or queue 502, can resolve an event to the resolved table or queue 503, or can re-assign an event to another operator. Depending on the operator's success in resolving the event, the event can be reassigned from the assigned events table or queue 504 to the resolved events table or queue 503 or back to the pending events table or queue 502. A resolved events process may indicate that action has been taken and may determine a time at which the operator should review the event based upon the type of action taken (e.g., to verify the alarm condition has been cleared).

When a pending or assigned event is resolved, the system can remove the event from the pending events table or queue 502, or assigned events table or queue 504, and can insert an entry into the resolved events table or queue 503. Entries in the resolved events table or queue 503 are events in a resolved event queue for which a remedial action has been taken. A time can be designated for review of the resolved events based on the action taken. For example, where an operator has provided a temporary solution to a problem that caused the alarm condition, the time for reviewing the event can be a one or more hours or days in the future. In another example, if the cause of the exception condition that caused the alarm condition has been resolved and only the arrival of more adequate mechanical parts for the repair remains at issue, the time for reviewing the event can be determined based on the expected time that the repair will be affected.

Following a complete resolution of the resolved event (e.g., no outstanding actions are scheduled), the event management system 105 can remove the event from the resolved event table or queue and can create an entry in an archived events table or queue 505 via a closed events table 506. The archived events table or queue 505 can be used for assessing alarms over time so as to identify recurring inefficiencies at a facility and to anticipate future failures across systems. In some embodiments, the archived events table or queue 505 can store events whose condition is resolved and events which have had no action for a period of time.

Events can be associated with a priority based on a set of predefined rules. For example, an event may be initially assigned a certain priority. If additional alarm messages pertaining to the same exception condition are received, the priority associated with the corresponding events can be increased. The priorities of some events can be increased automatically over time, where the resolution of the exception condition may be time-sensitive.

Events can be encrypted and/or generalized to hide or remove information that is specific to the condition of the facility system or fixture 101a-e, 102a-e that caused the event to be generated. Examples of such information include the manufacturer name, model number, device-specific error codes, and other information that can be used to identify particular characteristics of the facility system or fixture 101a-e, 102a-e. Users accessing the databases via terminals 304a-c can accordingly be restricted from viewing particular information contained in the alarm messages, e.g., only generalized information is accessible. In this manner, the user may, for example, only be able to determine that a circuit breaker has tripped in an HVAC system, but not be able to determine the manufacturer of the HVAC system or view any diagnostic information contained in the alarm message.

Figure 5:
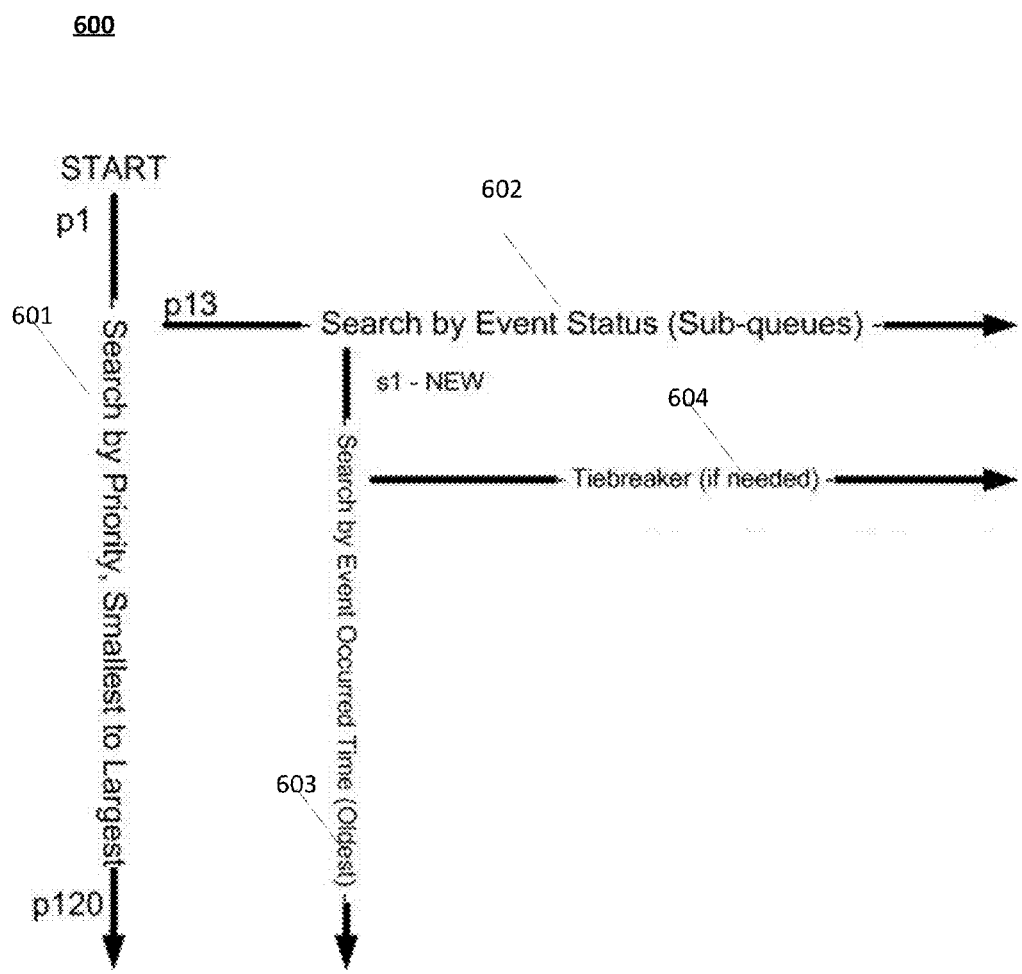
FIG. 5 depicts an exemplary operational diagram of operations of the alarm processing system in certain embodiments.

FIG. 5 is a flow diagram showing an example of a process 600 for notifying an operator of the presence of an exception condition. Process 600 may, for example, be used to identify events that are most in need of resolution by event priority level 601, e.g., smaller or lower event priority levels correspond to events that require more immediate attention. In this example, several events having a priority level 13 have been identified. The status 602 of each event having this priority level may be searched, e.g., to determine whether or not the exception condition corresponding to the event has been resolved. Unresolved events can be ordered by time of receipt 603. The oldest such events may be displayed to an operator before newer events. However, where two events were received sufficiently close in time, a tiebreaker 604 can be used to order the events. The tiebreaker may, for example, be based on the nature of the events, the priorities of a given facility, the capability of the operator or a technician to resolve the problem causing the exception condition, etc.

FIG. 6 depicts an example of a series of timing diagrams indicating how different facility monitoring systems 112a-e, and/or alarm message receiver systems 301a-d, can generate alarms to be transmitted to the event management system 105 in the absence of alarm interfaces 106*a-d*. Following an anomaly detection 1102, a monitoring system having an alarm system timing behavior 1110 may generate a series of alarm messages 1101*a-e* until the alarm has been acknowledged 1103. Alarm message receiver systems 301*a-d* may also affect the arrival time of the alarm messages 1101*a-e* at the event management system 105. Each message 1101*a-e* may, for example, contain portions of information regarding a single exception condition (e.g., an incomplete alarm message), and the event management system 105 may compile a complete alarm message from each portion. In another example, the alarm system timing behavior 1110 may cause multiple alarm messages 1101*a-e* to update the event management system 105 with respect to changes in the exception condition of the facility system or fixture 101*a-e*, 102*a-e*.

In another example, in the alarm system timing behavior 1111, only a single alarm message 1104 may be sent following detection of the exception condition. A system implementing behavior 1111 may not expect a response from the event management system 105 or may expect considerable delay until a response is received. In some instances, another alarm message may not be transmitted until an acknowledgement 1103 is received.

An event management system 105 configured to load independent events for each individual alarm message received (e.g., a system 105 expecting behavior 1111) may improperly generate additional messages from the alarm system timing behavior 1110, rather than updating an existing event as intended. For example, the alarm loader 107 may create multiple pending events when only a single pending event should be created. However, where the event management system 105 expects a plurality of messages until the anomaly is resolved (e.g., a system 105 expecting behavior 1110), the alarm system timing behavior 1111 may incorrectly indicate to the event management system 105 that the anomaly has been resolved, due to of the absence of subsequent messages following the first message 1104. The event management system 105 may then undesirably move events to the resolved database 503 and ultimately the archived database 505, when the events still require corrective action. In this situation, the event management system 105 may further fail to send acknowledgement 1103, having improperly determined that the alarm system implementing timing behavior 1111 no longer expects the exception condition to be resolved.

Accordingly, in some embodiments, disparate alarm system timing behaviors, such as, e.g., behaviors 1110, 1111 and their alarm message receiver systems 301*a-d*, can be accommodated. In some embodiments, the alarm interface 106 can anticipate inconsistencies or differences in the timing and format of alarm messages received from different facility monitoring systems 112*a-e* and can present the event management system 105 with consistently timed and/or formatted alarm messages regardless of the messaging protocol used at the originating facility monitoring systems 112*a-e* and/or alarm message receiver systems 301*a-d*. Where the operations of each alarm system timing behavior 1110 or corresponding alarm message receiver systems 301*a-d* split information among alarm messages 1101*a-e* or modify their timing, the alarm interface 106 can reassemble the alarm messages 1101*a-e* and deliver them at a time and manner expected by the event management system 105 for generation of events.

Figure 7:
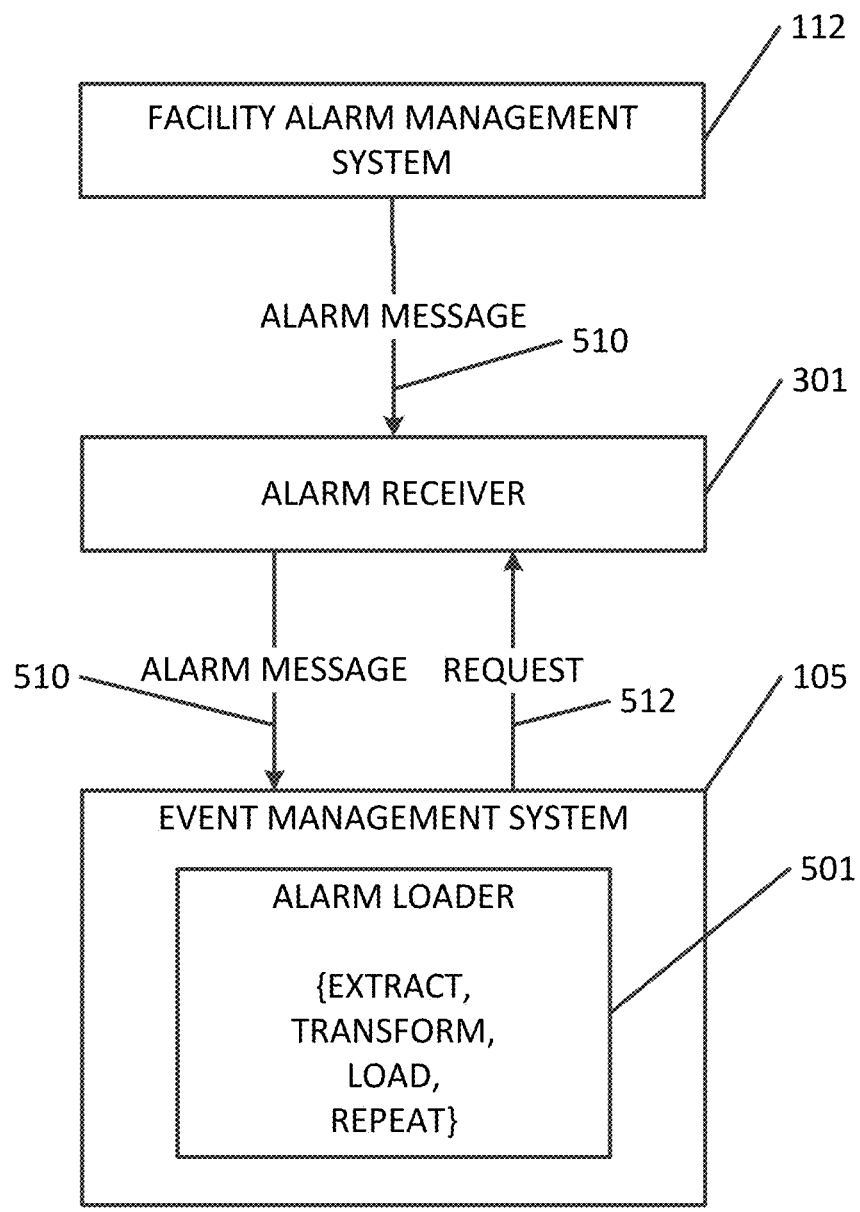
FIG. 7 depicts example logical relationships of the alarm processing system in certain embodiments.

FIG. 7 is a block diagram depicting example logical relationships within the topology 100 of FIGS. 2 and 4, including the facility alarm management system 112, the alarm receiver 301, the event management system 105 and the alarm loaders 501. As discussed above with respect to FIGS. 2 and 4, the facility alarm management system 112 transmits inbound alarm messages 510 to a respective alarm receiver 301. One example of an alarm message 510 is depicted in FIG. 8 and indicated at 810. The alarm loader 501 extracts (e.g., reads) the alarm messages 510 from the alarm receiver 301 and transforms (e.g., normalizes) the alarm messages 510. Several examples of normalized alarm messages are depicted in FIG. 8 and indicated at 820. Referring again to FIG. 7, the alarm loader 501 associated with the event management system 105 may send a request 512 to the alarm receiver 301 to extract one or more of the alarm messages 510. The extracted alarm messages 510 can be normalized, and the normalized messages can be loaded (e.g., stored) into the event database 520. In some embodiments, the alarm loader 501 can request the alarm receiver 301 to repeat transmission of one or more of the alarm messages 510 that have been previously extracted from the alarm receiver 301.

Figure 9:
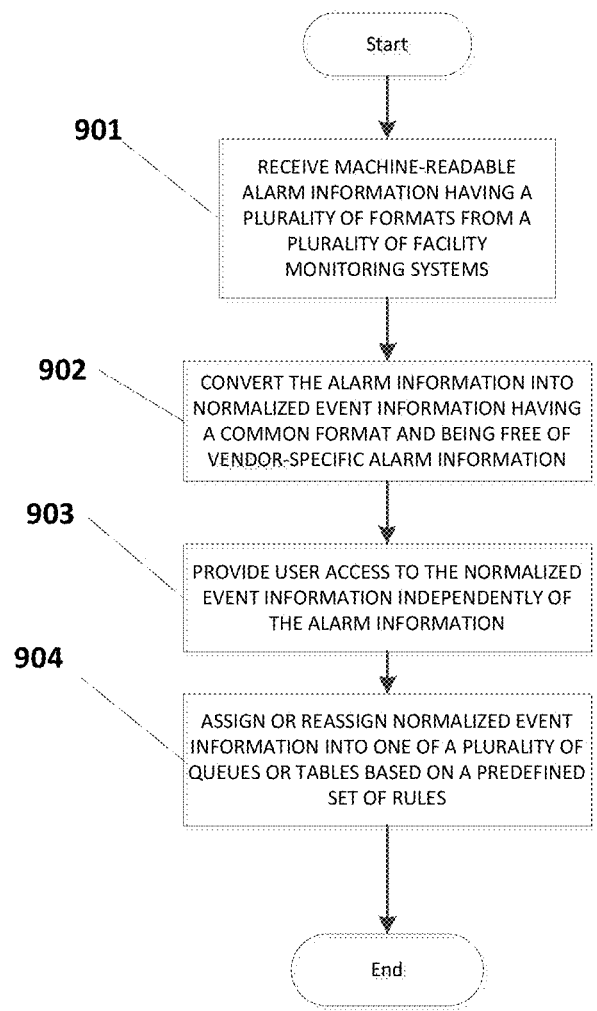
FIG. 9 depicts an exemplary flow diagram of the operation of an alarm interface in conjunction with an alarm loader in certain embodiments.

FIG. 9 is a flow diagram depicting an example of the operation of the event management system 105, according to an embodiment. In step 901, machine-readable alarm information having a plurality of formats is received from a plurality of facility monitoring systems, such as facility monitoring systems 112*a-e*. As discussed with respect to FIG. 6, at least some of the alarm notification messages may not be using a protocol expected by the event management system 105. In step 902, the alarm information is converted into normalized event information having a common format and being free of vendor-specific alarm information.

In step 903, user access to the normalized event information is provided independently of the alarm information. In other words, the user can access the event information without having access to the pre-normalized alarm information. In step 904, the normalized event information can be assigned or reassigned into one of a plurality of queues or tables (e.g., the pending events table 502, the resolved events table 503, the working events table 504, the closed events table 506 and/or the archived events table 505 of FIG. 4) based on a predefined set of rules.

Figure 10:
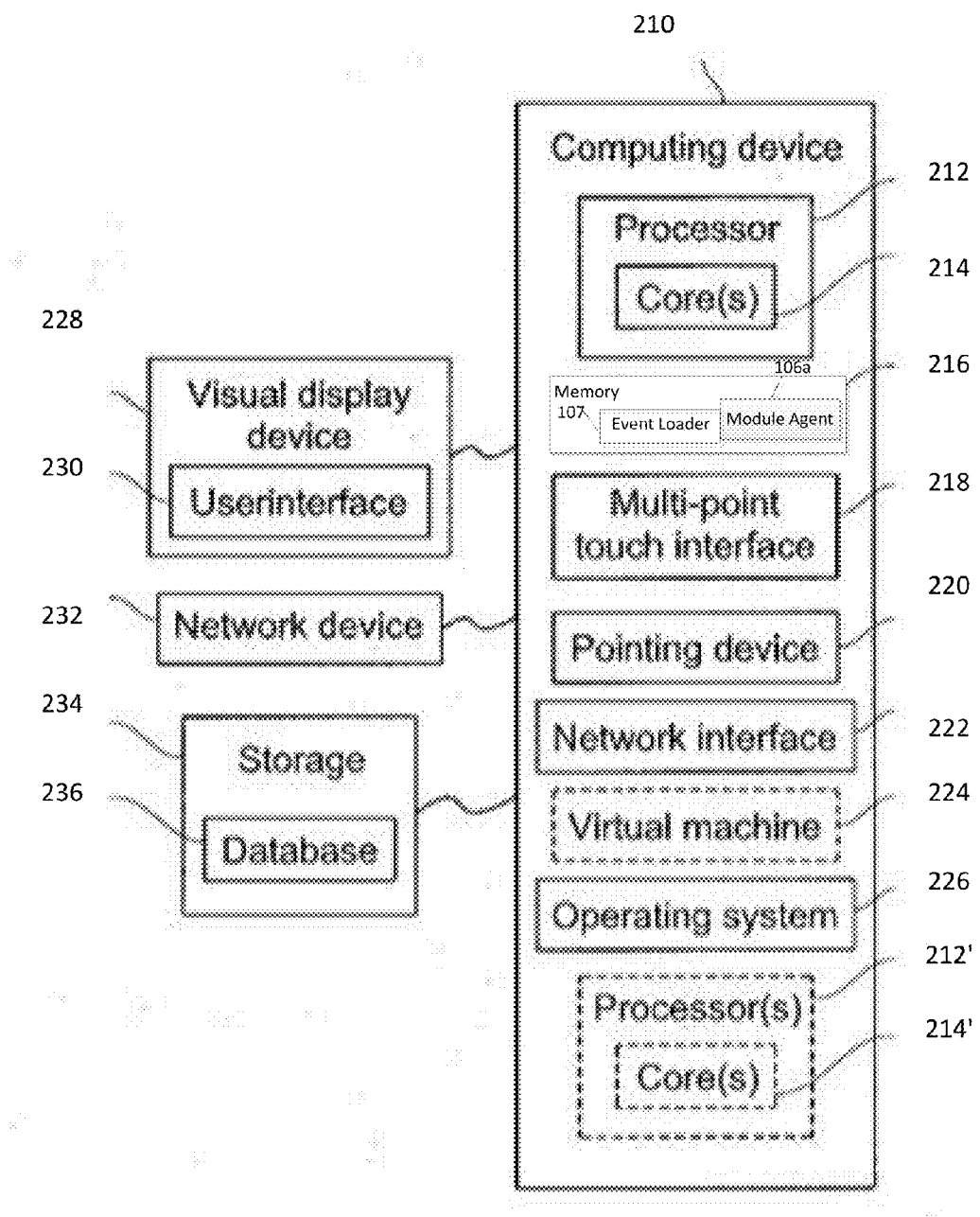
FIG. 10 depicts a block diagram of an exemplary computing device that may be programmed and/or configured to implement certain processes described in relation to various embodiments of the present disclosure.

FIG. 10 is a block diagram of an exemplary computing device 210 such as can be used, or portions thereof, in implementing event management system 105, alarm loader 107, alarm interfaces 106*a-d*, etc. The computing device 210 includes one or more non-transitory computer-readable media for storing one or more computer-executable instructions or software for implementing exemplary embodiments. The non-transitory computer-readable media can include, but are not limited to, one or more types of hardware memory, non-transitory tangible media (for example, one or more magnetic storage disks, one or more optical disks, one or more flash drives), and the like. For example, memory 216 included in the computing device 210 can include computer-readable and computer-executable instructions or software for performing various operations disclosed herein. Such instructions may take the form of an application running one, or both, of the alarm loader 107 and alarm interface 106*a* and their operations, as discussed above. The operations can also be distributed across multiple computing devices substantially similar to computing device 210, with each computing device performing a portion of the operation as described in greater detail below with reference to FIG. 10. The computing device 210 can also include configurable and/or programmable processor 212 and associated core 214, and optionally, one or more additional configurable and/or programmable processing devices, e.g., processor(s) 212*a* and associated core(s) 214*a* (for example, in the case of computer systems having multiple processors/cores), for executing computer-readable and computer-executable instructions or software in the memory 216 and other programs for controlling system hardware. Processor 212 and processor(s) 212a can each be a single core processor or multiple core (214 and 214a) processor.

Virtualization can be employed in the computing device 210 so that infrastructure and resources in the computing device can be shared dynamically. A virtual machine 224 can be provided to handle a process running on multiple processors so that the process appears to be using only one computing resource rather than multiple computing resources. Multiple virtual machines can also be used with one processor.

Memory 216 can include a computer system memory or random access memory, such as DRAM, SRAM, EDO RAM, and the like. Memory 216 can include other types of memory as well, or combinations thereof.

A user can interact with the computing device 210 through a visual display device 228, such as a computer monitor, which can display one or more user interfaces 230 that can be provided in accordance with exemplary embodiments. The computing device 210 can include other I/O devices for receiving input from a user, for example, a keyboard or any suitable multi-point touch interface 218, a pointing device 220 (e.g., a mouse). The keyboard 218 and the pointing device 220 can be coupled to the visual display device 128. The computing device 210 can include other suitable conventional I/O peripherals.

The computing device 210 can also include one or more storage devices 234, such as a hard-drive, CD-ROM, or other computer readable media, for storing data and computer-readable instructions and/or software which can perform the operations disclosed herein. Exemplary storage device 234 can also support one or more databases 236 for storing any suitable information required to implement exemplary embodiments (e.g., event databases 502-505). The databases can be updated manually or automatically at any suitable time to add, delete, and/or update one or more items in the databases. Exemplary storage device 234 can also store all or portions of the alarm loader 107 and alarm interface 106 prior to execution in some embodiments.

The computing device 210 can include a network interface 222 configured to interface via one or more network devices 232 with one or more networks, for example, Local Area Network (LAN), Wide Area Network (WAN) or the Internet through a variety of connections including, but not limited to, standard telephone lines, LAN or WAN links (for example, 802.11, T1, T3, 56 kb, X.25), broadband connections (for example, ISDN, Frame Relay, ATM), wireless connections, controller area network (CAN), or some combination of any or all of the above. The network interface 222 can include a built-in network adapter, network interface card, PCMCIA network card, card bus network adapter, wireless network adapter, USB network adapter, modem or any other device suitable for interfacing the computing device 210 to any type of network capable of communication and performing the operations described herein. Moreover, the computing device 210 can be any computer system, such as a workstation, desktop computer, server, laptop, handheld computer, tablet computer, or other form of computing or telecommunications device that is capable of communication and that has sufficient processor power and memory capacity to perform the operations described herein.

The computing device 210 can run any operating system 226, such as any of the versions of the Microsoft® Windows® operating systems, the different releases of the Unix and Linux operating systems, any version of the MacOS® for Macintosh computers, any embedded operating system, any real-time operating system, any open source operating system, any proprietary operating system, or any other operating system capable of running on the computing device and performing the operations described herein. In exemplary embodiments, the operating system 226 can be run in native mode or emulated mode. In an exemplary embodiment, the operating system 226 can be run on one or more cloud machine instances.

Figure 11:
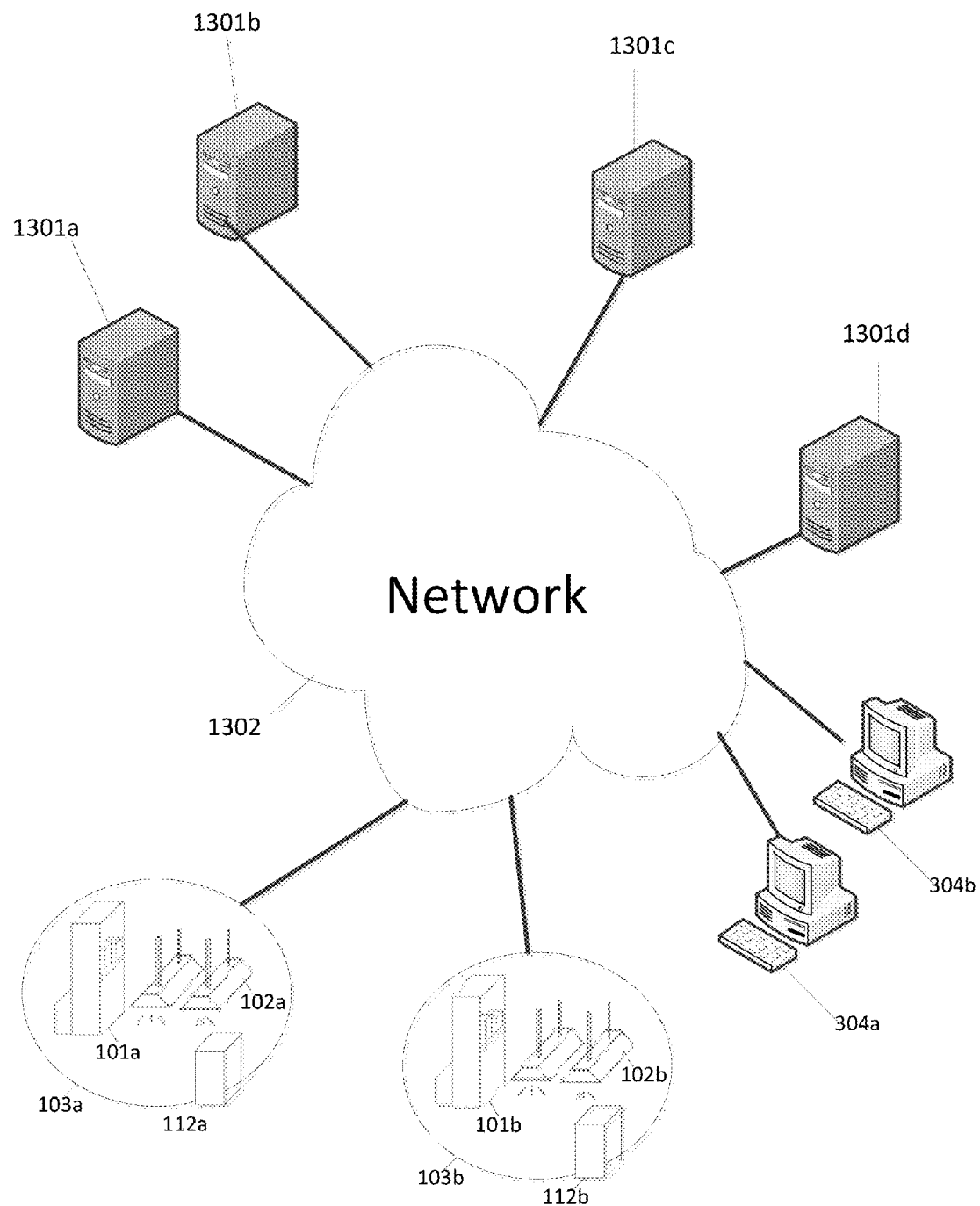
FIG. 11 depicts an exemplary topology of a distributed computing environment that may be used to implement certain embodiments.

FIG. 11 is an example computational device block diagram of certain distributed embodiments. Although the exemplary discussion above occasionally make references to a single computational system 210, one will recognize that various of the modules within computational system 210, alarm loader 107, or alarm interface 106, may instead be distributed across a network 1302 in separate server systems 1301a-d. Each of the facilities 103a-e and terminals 304a, 304b can communicate with the server systems 1301a-d across a network 1302 such as the Internet. Messaging and routing protocols may be used to ensure that alarm messages from the facilities 103a-e travel first to the server systems 1302a-d implementing the alarm interface, before travelling to the event management system and alarm loader 107.

In describing exemplary embodiments, specific terminology is used for the sake of clarity. For purposes of description, each specific term is intended to at least include all technical and functional equivalents that operate in a similar manner to accomplish a similar purpose. Additionally, in some instances where a particular exemplary embodiment includes a plurality of system elements, device components or method steps, those elements, components or steps can be replaced with a single element, component or step. Likewise, a single element, component or step can be replaced with a plurality of elements, components or steps that serve the same purpose. Moreover, while exemplary embodiments have been shown and described with references to particular embodiments thereof, those of ordinary skill in the art will understand that various substitutions and alterations in form and detail can be made therein without departing from the scope of the invention. Further still, other aspects, functions and advantages are also within the scope of the invention.

Exemplary flowcharts are provided herein for illustrative purposes and are non-limiting examples of methods. One of ordinary skill in the art will recognize that exemplary methods may include more or fewer steps than those illustrated in the exemplary flowcharts, and that the steps in the exemplary flowcharts may be performed in a different order than the order shown in the illustrative flowcharts.

What is claimed is:

1. A computer-implemented method of processing alarms, comprising:
   receiving, by a processor, machine-readable alarm information having a plurality of formats from a plurality of facility monitoring systems;
   converting, by the processor, the machine-readable alarm information into normalized machine-readable event information having a common format and being free of vendor-specific alarm information, the normalized event information representing temporal occurrences of multiple alarm messages included in the machine-readable alarm information that correspond to common exception conditions detected by at least one of the plurality of monitoring systems; and
   providing, by the processor via a user interface, user access to the normalized event information independently of the alarm information.

2. The computer-implemented method of claim 1, further comprising assigning, by the processor, the normalized event information to one of a plurality of queues based on a predefined set of rules.

3. The computer-implemented method of claim 2, further comprising automatically reassigning, by the processor, the normalized event information to a different queue based on a predefined set of event resolution rules.

4. The computer-implemented method of claim 2, wherein the plurality of queues includes a pending event queue, an assigned event queue, a resolved event queue, and an archived event queue.

5. The computer-implemented method of claim 1, further comprising assigning, by the processor, a priority to the event information based at least in part on a predefined set of rules.

6. The computer-implemented method of claim 5, further comprising changing, by the processor, the priority based on the predefined set of rules.

7. The computer-implemented method of claim 6, wherein changing the priority includes changing the priority based on at least one of an amount of time elapsed since the alarm information was received and a number of discrete alarms contained in the alarm information.

8. The computer-implemented method of claim 1, further comprising associating, by the processor, the normalized event information with a user based on a predefined set of rules.

9. A non-transitory computer-readable medium having stored thereon computer-executable instructions that when executed by a processor cause the processor to:
    receive machine-readable alarm information having a plurality of formats from a plurality of facility monitoring systems;
    convert the machine-readable alarm information into normalized machine-readable event information having a common format and being free of vendor-specific alarm information, the normalized event information representing temporal occurrences of multiple alarm messages included in the machine-readable alarm information that correspond to common exception conditions detected by at least one of the plurality of monitoring systems; and
    provide, via a user interface, user access to the normalized event information independently of the alarm information.

10. The non-transitory computer readable medium of claim 9, further comprising computer-readable instructions that when executed by the processor cause the processor to assign the normalized event information to one of a plurality of queues based on a predefined set of rules.

11. The non-transitory computer readable medium of claim 10, further comprising computer-readable instructions that when executed by the processor cause the processor to automatically reassign the normalized event information to a different queue based on a predefined set of event resolution rules.

12. The non-transitory computer readable medium of claim 10, wherein the plurality of queues includes a pending event queue, an assigned event queue, a resolved event queue, and an archived event queue.

13. The non-transitory computer readable medium of claim 9, further comprising computer-readable instructions that when executed by the processor cause the processor to assign a priority to the event information based at least in part on a predefined set of rules.

14. The non-transitory computer readable medium of claim 13, further comprising computer-readable instructions that when executed by the processor cause the processor to change the priority based on the predefined set of rules.

15. The non-transitory computer readable medium of claim 14, further comprising computer-readable instructions that when executed by the processor cause the processor to change the priority based on at least one of an amount of time elapsed since the alarm information was received and a number of discrete alarms contained in the alarm information.

16. The non-transitory computer readable medium of claim 9, further comprising computer-readable instructions that when executed by the processor cause the processor to associate the normalized event information with a user based on a predefined set of rules.

17. A system for processing alarms, comprising:
    a processor; and
    a memory operatively coupled to the processor, the memory including computer-executable instructions that when executed by the processor cause the processor to:
        receive machine-readable alarm information having a plurality of formats from a plurality of facility monitoring systems;
        convert the machine-readable alarm information into normalized machine-readable event information having a common format and being free of vendor-specific alarm information, the normalized event information representing temporal occurrences of multiple alarm messages included in the machine-readable alarm information that correspond to common exception conditions detected by at least one of the plurality of monitoring systems; and
        provide, via a user interface, user access to the normalized event information independently of the alarm information.

18. The system of claim 17, wherein the memory further includes computer-executable instructions that when executed by the processor cause the processor to assign the normalized event information to one of a plurality of queues based on a predefined set of rules.

19. The system of claim 17, wherein the memory further includes computer-executable instructions that when executed by the processor cause the processor to assign a priority to the event information based at least in part on a predefined set of rules.

20. The system of claim 17, wherein the memory further includes computer-executable instructions that when executed by the processor cause the processor to associate the normalized event information with a user based on a predefined set of rules.

* * * * *